US012785597B2

(12) United States Patent
Hossain et al.

(10) Patent No.: US 12,785,597 B2
(45) Date of Patent: Nov. 3, 2026

(54) SURFACE-MOUNTED PERMANENT MAGNET MOTOR CONTROL USING CALCULATED REFERENCE CURRENT AND VOLTAGE

(71) Applicant: Steering Solutions IP Holding Corporation, Saginaw, MI (US)

(72) Inventors: Md Abid Hossain, Saginaw, MI (US); Thomas J. Stutts, Linwood, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 226 days.

(21) Appl. No.: 18/656,911

(22) Filed: May 7, 2024

(65) Prior Publication Data

US 2025/0350221 A1 Nov. 13, 2025

(51) Int. Cl.

| | |
|---|---|
| ***H02P 21/22*** | (2016.01) |
| ***B62D 5/04*** | (2006.01) |
| ***H02P 27/12*** | (2006.01) |

(52) U.S. Cl.

CPC .............. *H02P 21/22* (2016.02); *B62D 5/046* (2013.01); *H02P 27/12* (2013.01); *H02P 2207/055* (2013.01)

(58) Field of Classification Search

CPC .... H02P 21/0089; H02P 21/22; H02P 23/009; H02P 2207/05; H02P 6/08; H02P 21/14; H02P 27/06; H02P 27/08; H02P 21/00; H02P 2205/05; H02P 2207/055; H02P 25/022; H02P 5/46; H02P 9/302; H02P 6/32; H02P 21/0003; H02P 21/24; H02P 2203/09; H02P 23/30; H02P 6/10; H02P 6/20; H02P 21/0021; H02P 7/06; H02P 27/12; H02K 21/22; B60L 15/20; B60L 2240/423; B60L 15/025; B60L 2220/14; B60L 3/0061; B60L 2240/427; B60L 2240/429; B60L 3/003; B62D 5/046; B62D 5/0463; B62D 5/0481; G05B 17/02; B60W 2710/083; B60W 10/08

See application file for complete search history.

(56) References Cited

U.S. PATENT DOCUMENTS

| | | | | |
|---|---|---|---|---|
| 9,531,311 | B2 | 12/2016 | Collier-Hallman | |
| 2008/0116842 | A1 * | 5/2008 | Cheng ..................... | H02P 21/22 318/807 |

* cited by examiner

*Primary Examiner* — Antony M Paul

(74) *Attorney, Agent, or Firm* — Dickinson Wright PLLC

(57) ABSTRACT

Technical solutions are described for controlling a surface-mounted permanent magnet (SPM) motor, including: determining a peak torque value; determining a limited torque command based on a torque command and which does not exceed the peak torque value; determining, based on the limited torque command, an optimized current command; determining, based on the optimized current command, a reference voltage vector; and commanding, based on the reference voltage vector, an inverter to apply an output voltage to the SPM motor. Determining the reference voltage vector includes: calculating an optimized voltage command based on the optimized current command; determining a required d-axis current based on the optimized voltage command and based on a bridge voltage satisfying a supply voltage constraint; determining a reference d-axis current based on the required d-axis current; determining a reference current vector including the reference d-axis current; and calculating the reference voltage vector based on the reference current vector.

20 Claims, 6 Drawing Sheets

SURFACE-MOUNTED PERMANENT MAGNET MOTOR CONTROL USING CALCULATED REFERENCE CURRENT AND VOLTAGE

BACKGROUND

Permanent magnet synchronous machines (PMSM) commonly used in a variety of applications including Electric Power Steering (EPS) systems. These PMSM motors provide the highest efficiency, less torque ripples, less noise, high torque density, and better performance.

There are two main types of PMSM: Surface-mounted PMSM (SPMSM or SPM) and interior-mounted PMSM (IPMSM or IPM). However, SPM motors are becoming more commonly used for many different applications. Existing control algorithms are generally applicable to both SPM and IPM motor types. Many control algorithms can be simplified for SPM. Existing control techniques may use iteration methods to determine reference current and voltage values. Such iteration methods enables the control algorithms to be applied to IPM motor types. However, including iteration methods adds significant computation time, resulting in higher processor loads. With increasing cost pressures, reduction of microprocessor load is an important consideration.

SUMMARY

According to one or more embodiments, a method for controlling a surface-mounted permanent magnet (SPM) motor is provided. The method includes: determining a peak torque value; determining a limited torque command based on a torque command and which does not exceed the peak torque value; determining, based on the limited torque command, an optimized current command to cause the SPM motor to generate an output torque in accordance with the limited torque command; determining, based on the optimized current command, a reference voltage vector; and commanding, based on the reference voltage vector, an inverter to apply an output voltage to the SPM motor. Determining the reference voltage vector may include: calculating an optimized voltage command based on the optimized current command; determining a required d-axis current based on the optimized voltage command and based on a bridge voltage satisfying a supply voltage constraint; determining a reference d-axis current based on the required d-axis current; determining a reference current vector including the reference d-axis current; and calculating the reference voltage vector based on the reference current vector.

According to one or more embodiments, an electronic controller includes: a processor; and a memory that includes instructions. The instructions, when executed by the processor, cause the processor to: determine a peak torque value; determine a limited torque command based on a torque command and which does not exceed the peak torque value; determine, based on the limited torque command, an optimized current command to cause a surface-mounted permanent magnet (SPM) motor to generate an output torque in accordance with the limited torque command; determine, based on the optimized current command, a reference voltage vector; and command, based on the reference voltage vector, an inverter to apply an output voltage to the SPM motor. The instructions further cause the processor to: calculate an optimized voltage command based on the optimized current command; determine a required d-axis current based on the optimized voltage command and based on a bridge voltage satisfying a supply voltage constraint; determine a reference d-axis current based on the required d-axis current; determine a reference current vector including the reference d-axis current; and calculate the reference voltage vector based on the reference current vector.

According to one or more embodiments, a motor control system includes: a surface-mounted permanent magnet (SPM) motor; an inverter configured to supply an alternating current (AC) power to the SPM motor; and a controller. The controller is configured to: determine a peak torque value; determine a limited torque command based on a torque command and which does not exceed the peak torque value; determine, based on the limited torque command, an optimized current command to cause the SPM motor to generate an output torque in accordance with the limited torque command; determine, based on the optimized current command, a reference voltage vector; and command, based on the reference voltage vector, the inverter to apply an output voltage to the SPM motor. The controller is further configured to: calculate an optimized voltage command based on the optimized current command; determine a required d-axis current based on the optimized voltage command and based on a bridge voltage satisfying a supply voltage constraint; determine a reference d-axis current based on the required d-axis current; determine a reference current vector including the reference d-axis current; and calculate the reference voltage vector based on the reference current vector.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present disclosure provides a system and method for controlling SPM motors. The system and method of the present disclosure does not require any iteration, thereby making the process more robust, quick, and able to run at a faster sampling rate compared to conventional motor control systems and methods. The system and method of the present disclosure is more dynamic and avoids common issues with conventional motor controllers, such as being unable to converge to a solution due to initial guesses and setting up parameters. The system and method of the present disclosure provides several improvements over conventional devices and methods, reducing many variables and parameters defined at various stages. The system and method of the present disclosure may thereby simplify or eliminate several different calculations required by conventional motor controllers. Thus, the system and method of the present disclosure may enable use of a less costly processor or using a same processor for additional functionality.

Figure 1:
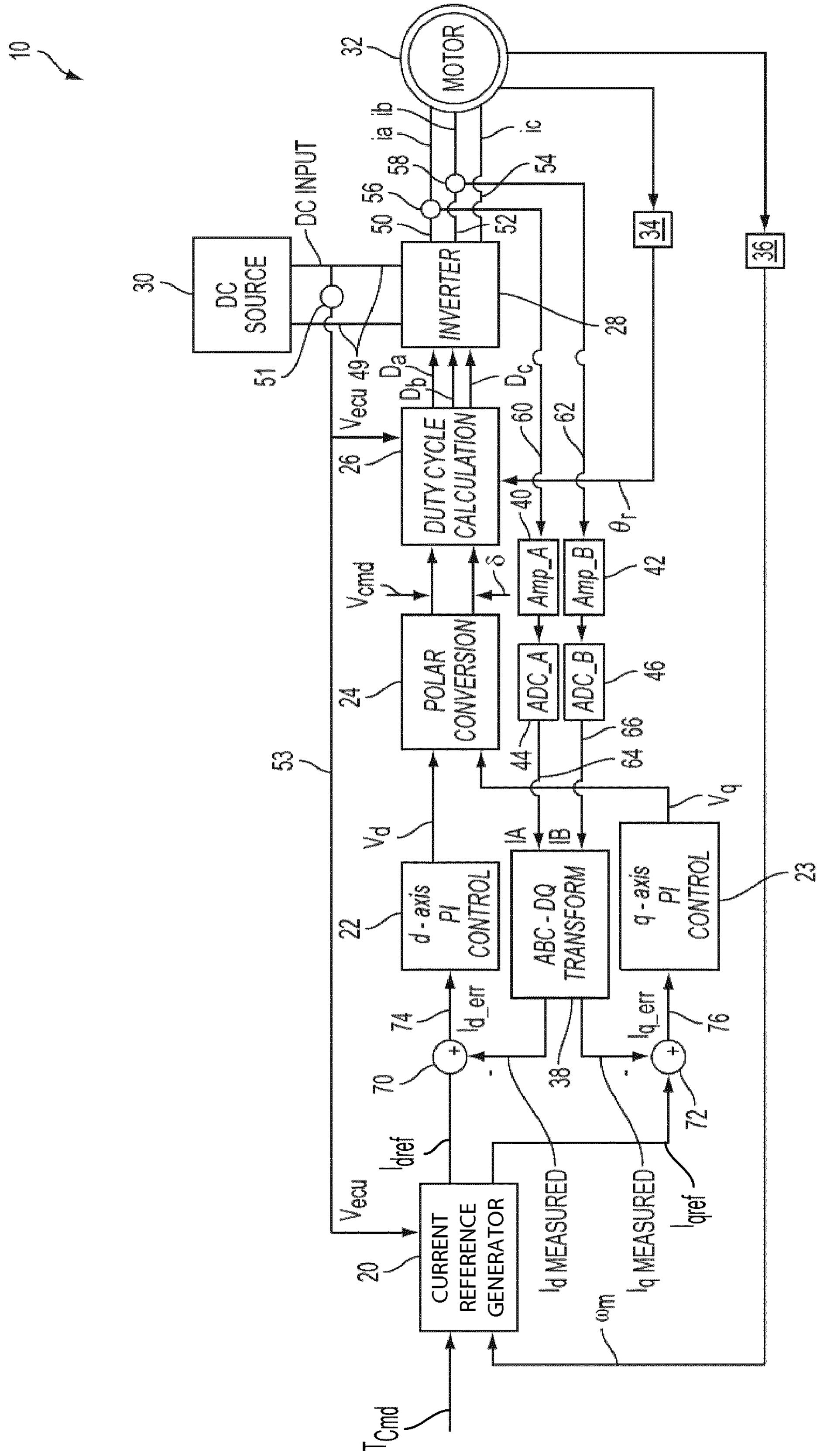
FIG. 1 depicts a block diagram of a motor control system, according to aspects of the present disclosure.

Referring now to the Figures, where the invention will be described with reference to specific embodiments, without limiting same, FIG. 1 shows an exemplary block diagram of a motor control system 10. The motor control system 10 includes a current reference generator 20, a d-axis proportional plus integral gain (PI) controller 22, a q-axis PI controller 23, a polar conversion controller 24, a pulse width modulation (PWM) inverter controller 26, an inverter 28, a DC power source 30, a SPM motor 32, a position sensor 34, a speed sensor 36, a transform controller 38, an a-phase current amplifier 40, a b-phase current amplifier 42, an a-phase analog to digital converter (ADC) 44, and a b-phase ADC 46. The SPM motor 32 may be controlled in a current mode of control or a voltage mode of control. The motor control system 10 may be part of an electronic power steering system (not depicted). The SPM motor 32 may be configured to provide a steering assist toque based on a torque command.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the current reference generator 20 and the PWM inverter controller 26. In the exemplary embodiment as shown, the inverter 28 transmits three alternating current (AC) phase currents to the SPM motor 32 (e.g., $i_a$, $i_b$, and $i_c$) by line 50, line 52, and line 54 for operation and control of the SPM motor 32. The bridge voltage $V_{ecu}$ may represent a maximum voltage available for use in controlling the SPM motor 32. Alternatively, the maximum voltage can be a percentage of the bridge voltage $V_{ecu}$, such as 90% or 95% of the bridge voltage $V_{ecu}$.

For feedback control purposes, the phase currents $i_a$ and $i_b$ transmitted to the SPM motor 32 by lines 50 and 52 may be detected to determine the instantaneous current flow to the SPM motor 32. Specifically, a first current sensor 56 may be used to monitor the a-phase current $i_a$ on the line 50, and a second current sensor 58 may be used to monitor the b-phase current $i_b$ on the line 52. It should be noted that although two of the current sensors 56, 58 are illustrated, only one of the lines 50 or 52 may be monitored to measure either a-phase current $i_a$ or b-phase current $i_b$. A first control signal 60 representing the measured a-phase current $i_a$ may be sent to the a-phase current amplifier 40 from the first current sensor 56, and a second control signal 62 representing the measured b-phase current $i_b$ may be sent to the b-phase current amplifier 42 from the second current sensor 58. An augmented or amplified value of the a-phase current $i_a$ is then sent to the a-phase ADC 44 from the a-phase current amplifier 40, and an amplified value of the b-phase current $i_b$ is sent to the b-phase ADC 46 from the b-phase current amplifier 42. The a-phase ADC 44 converts the amplified value of the a-phase current $i_a$ into a digital value 64. The digital value 64 represent the magnitude of the a-phase current $i_a$. The b-phase ADC 46 converts the amplified value of the b-phase current $i_b$ into a digital value 66. The digital value 66 represents the magnitude of the b-phase current $i_b$.

The transform controller 38 receives, as inputs, the digital value 64 from the a-phase ADC 44 and the digital value 66 from the b-phase ADC 46. In one embodiment, the transform controller 38 is a three-phase to two-phase transformation controller where measured values for the AC current (e.g., the digital value 64 representing the a-phase current $i_a$ and the digital value 66 representing the b-phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a first subtractor 70 and the measured q-axis current $I_{qMEASURED}$ is sent to a second subtractor 72.

The current reference generator 20 receives, as input, a torque command $T_{Cmd}$, an angular speed Om, and the control signal 53 representing the bridge voltage $V_{ecu}$ from the transducer 51. The torque command $T_{Cmd}$ represents a commanded torque value, and may be derived from another controller (not shown), or may correspond to a torque value generated by an operator. The angular speed Om is measured by the speed sensor 36. The speed sensor 36 may include, for example, an encoder and a speed calculation circuit for calculating the angular speed of a rotor (not shown) of the SPM motor 32 based on a signal received by the encoder. The current reference generator 20 calculates a reference d-axis current $I_{dref}$ and a reference q-axis current $I_{qref}$ based on the torque command $T_{Cmd}$, the bridge voltage $V_{ecu}$, and the angular speed @m, which is described below. The reference d-axis current $I_{dref}$ is sent to the first subtractor 70, and the reference q-axis current $I_{qref}$ is sent to the second subtractor 72.

The first subtractor 70 receives the measured d-axis current $I_{dMEASURED}$ and the reference d-axis current $I_{dref}$. The first subtractor 70 determines a d-axis error signal 74 based on the measured d-axis current $I_{dMEASURED}$ and the reference d-axis current $I_{dref}$. The d-axis error signal 74 represents the error between the measured d-axis current $I_{dMEASURED}$ and the reference d-axis current $I_{dref}$. The second subtractor 72 receives the measured q-axis current $I_{qMEASURED}$ and the reference q-axis current $I_{qref}$. The second subtractor 72 determines a q-axis error signal 76 based on the measured q-axis current $I_{qMEASURED}$ and the reference q-axis current $I_{qref}$. The q-axis error signal 76 represents the error between the measured q-axis current $I_{qMEASURED}$ and the reference q-axis current $I_{qref}$.

The d-axis PI controller 22 receives as input the d-axis error signal 74 from the first subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the second subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle δ. The PWM inverter controller 26 receives as inputs the voltage command $V_{cmd}$ and the phase advance angle δ from the polar conversion controller 24. The PWM inverter controller 26 also receives a rotor angle value Or measured by the position sensor 34. In one exemplary embodiment, the PWM inverter controller 26 may include an over-modulation space vector PWM unit to generate three respective duty cycle values Da, Db, and Dc. The duty cycle values Da, Db, and De are used to drive gate drive circuits (not shown) of the inverter 28 that energize phases of the of the SPM motor 32.

Figure 2:
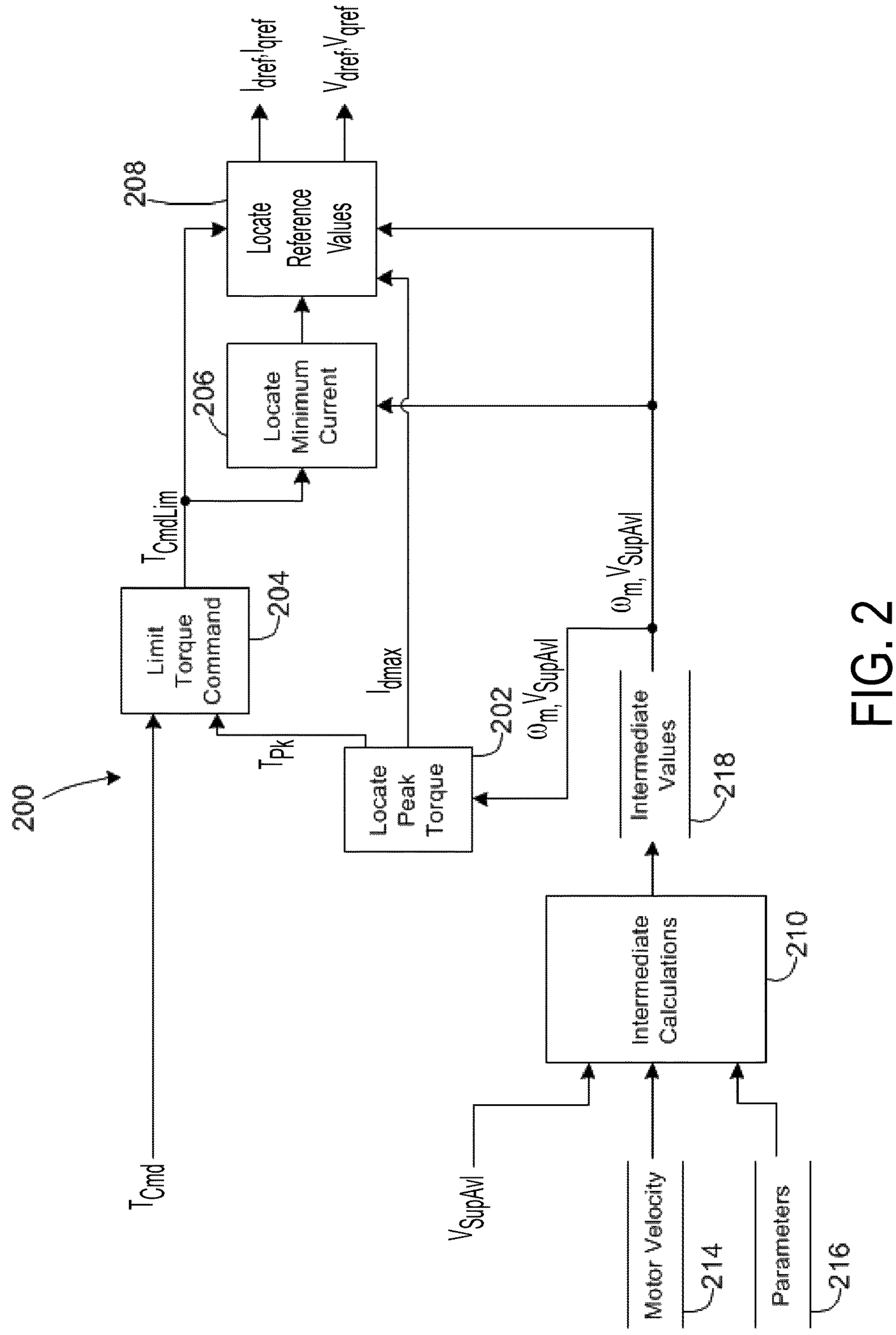
FIG. 2 depicts a block diagram of a current reference generator, according to aspects of the present disclosure.

FIG. 2 is a block diagram of a current reference generator 200 in accordance with an exemplary embodiment of the invention. The current reference generator 200 is an embodiment of the current reference generator 20 of FIG. 1. In an alternate embodiment, the current reference generator 200 is used in a voltage mode system configured to operate based on a reference voltage vector, such as a SPM motor controlled in a voltage mode. As previously described, in voltage controlled motors, a reference voltage vector in polar coordinates is typically generated such that the efficiency is maximized until the magnitude of the voltage approaches the DC input voltage to the controller. After that, the phase angle is changed to obtain the desired torque with the limited voltage. However, motor control systems typically do not support both motors controlled in a voltage mode and in a current mode. In contrast, the current reference generator 200 produces both a reference current vector and reference voltage vector to support either a voltage or current controlled motor.

As can be appreciated, the modules shown in FIG. 2 can be combined and/or further partitioned to similarly generate a reference current vector and a reference voltage vector.

In the example of FIG. 2, the current reference generator 200 includes a peak torque calculator 202, a torque command limiter 204, a minimum current locator 206, and a reference values locator 208. The current reference generator 200 may also include an intermediate values calculator 210 that determines a plurality of intermediate values 218 based on a plurality of motor parameters 216, supply voltage constraint $V_{SupAvl}$, and a motor velocity 214. The intermediate values 218 can be calculated in one interval and used repeatedly over multiple intervals by the peak torque calculator 202. The intermediate values 218 can also be provided to the minimum current locator 206 and the reference values locator 208. The current reference generator 200 also receives a torque command $T_{Cmd}$ and generates values for a reference current vector $I_{dref}$, $I_{qref}$ and for a reference voltage vector $V_{dref}$, $V_{qref}$.

The supply voltage constraint $V_{SupAvl}$ is not necessarily equal to the bridge voltage $V_{ECU}$, since the full bridge voltage $V_{ECU}$ may not be available to be applied to the SPM motor 32. For example, the supply voltage constraint $V_{SupAvl}$ can be the bridge voltage $V_{ECU}$ of FIG. 1 or a percentage of the bridge voltage $V_{ecu}$, such as 90% or 95% of the bridge voltage $V_{ECU}$.

The motor velocity 214 may be the angular speed Om measured by the speed sensor 36 of FIG. 1, where the SPM motor 32 of FIG. 1 is controlled by the current reference generator 200. The motor parameters 216 may be measured or estimated values for the SPM motor 32 of FIG. 1, including, for example, a back EMF constant ($K_e$), a motor circuit resistance (R), a direct axis inductance ($L_d$), a quadrature axis inductance ($L_q$), and a number of poles ($N_{poles}$). The reference current vector $I_{dref}$, $I_{qref}$ can include the reference d-axis current $I_{dref}$ and reference q-axis current $I_{qref}$ of FIG. 1. The reference voltage vector $V_{dref}$, $V_{qref}$ can include a reference d-axis voltage $V_{dref}$ and a reference q-axis voltage $V_{qref}$. The reference voltage vector $V_{dref}$, $V_{qref}$ may be equivalent to the voltage command $V_{cmd}$.

The peak torque calculator 202 determines a peak torque value $T_{Pk}$ and a direct axis current $I_{dmax}$ that corresponds to the peak torque value $T_{Pk}$ based on the motor parameters 216, the supply voltage constraint $V_{SupAvl}$, the motor velocity 214, and a sign of the torque command $T_{Cmd}$. The peak torque calculator 202 may be further configured to rotate a voltage vector in a circle for a finite number of steps, map the voltage vector to a current vector, create a bracket array of torque values based on the current vector, and search the bracket array for the peak torque value. The peak torque calculator 202 can be further configured to adjust any of the bracket arrays having an angle of zero to wrap the angle, and perform iterative parabolic interpolation to refine a location of the peak torque value.

The torque command limiter 204 determines a limited torque command $T_{CmdLim}$ based on the torque command $T_{Cmd}$ limited not to exceed the peak torque value $T_{pk}$. The minimum current locator 206 determines an optimized current command $I_{dmin}$, $I_{qmin}$ based on the limited torque command $T_{CmdLim}$. The optimized current command $I_{dmin}$, $I_{qmin}$ may include a d-axis current component $I_{dmin}$ and a q-axis current component $I_{qmin}$. In some embodiments, the minimum current locator 206 may be configured to determine the optimized current command $I_{dmin}$, $I_{qmin}$ using a maximum torque per Ampere (MTPA) technique. In some embodiments, the minimum current locator 206 may be configured to perform an iterative parabolic interpolation using a direct axis current of zero, a direct axis current equal to the torque command divided by a motor constant, and half of the torque command divided by the motor constant as initial points for the iterative parabolic interpolation. The minimum current locator 206 may calculate the optimized current command $I_{dmin}$, $I_{qmin}$ as set forth in equation (6), as described further below.

The reference values locator 208 generates a reference vector that satisfies the torque command $T_{Cmd}$ as limited by the direct axis current that corresponds to the peak torque value and the direct axis current that results in the minimum motor current. The reference values locator 208 is further configured to perform a minimum test to set the reference vector to a minimum value based on determining that the direct axis current that results in the minimum motor current satisfies the torque command $T_{Cmd}$. The reference values locator 208 is also configured to perform a maximum test to set the reference vector to a maximum value based on determining that the direct axis current that corresponds to the peak torque value does not satisfy the torque command $T_{Cmd}$. An interval bisection search is performed based on determining that minimum test and the maximum test are not met. The reference values locator 208 is further configured to compute values of the reference current vector $I_{dref}$, $I_{qref}$ and the reference voltage vector $V_{dref}$, $V_{qref}$. The reference values locator 208 can be configured to set the reference current vector $I_{dref}$, $I_{qref}$ as a reference vector that satisfies the torque command $T_{Cmd}$, where the SPM motor 32 is controlled in a current mode. Additionally or alternatively, the reference values locator 208 can be configured to set the reference voltage vector $V_{dref}$, $V_{qref}$ as a reference vector that satisfies the torque command $T_{Cmd}$, where the SPM motor 32 is controlled in a voltage mode.

Figure 3:
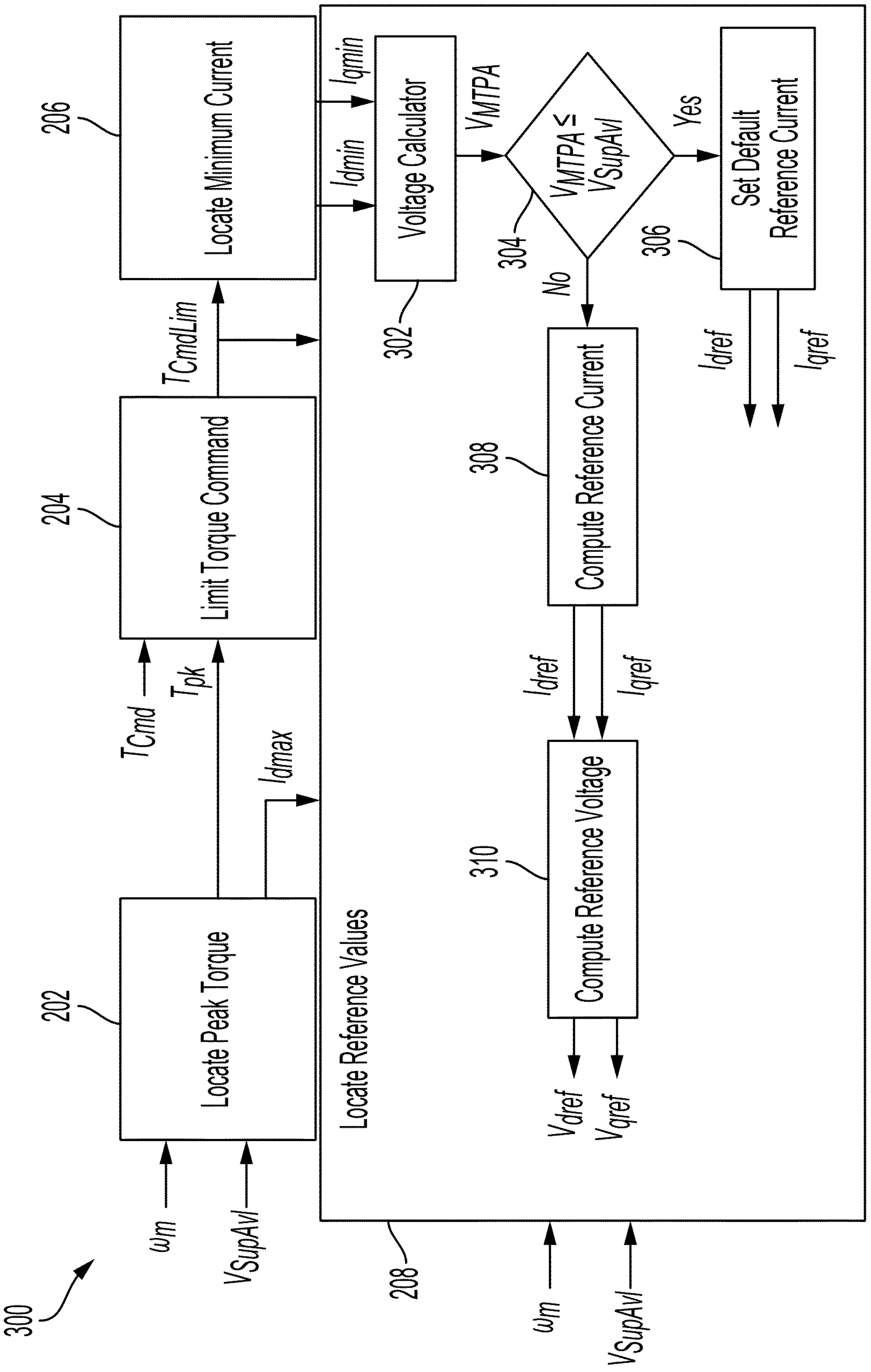
FIG. 3 depicts a block diagram of a reference voltage calculator, according to aspects of the present disclosure.

FIG. 3 depicts a block diagram of a reference voltage calculator 300 of the present disclosure. The reference voltage calculator 300 is configured to calculate a reference current vector $I_{dref}$, $I_{qref}$ and a reference voltage vector $V_{dref}$, $V_{qref}$ based on the reference current vector $I_{dref}$, $I_{qref}$. Each of the reference voltage vector $V_{dref}$, $V_{qref}$ and the reference current vector $I_{dref}$, $I_{qref}$ may be specified as vectors having a d-axis component and a q-axis component.

The reference voltage calculator 300 includes the peak torque calculator 202, the torque command limiter 204, the minimum current locator 206, and the reference values locator 208. The reference values locator 208 shown on FIG. 3 includes internal details describing how the reference voltage vector $V_{dref}$, $V_{qref}$ and the reference current vector $I_{dref}$, $I_{qref}$ may be computed.

As shown in FIG. 3, the reference values locator 208 includes a voltage calculator 302 configured to compute an optimized voltage command $V_{MTPA}$ based on the optimized current command $I_{dmin}$, $I_{qmin}$. The reference values locator 208 also includes a comparator 304 configured to compare the optimized voltage command $V_{MTPA}$ to the supply voltage constraint $V_{SupAvl}$ and to determine if the optimized voltage command $V_{MTPA}$ is less-than or equal to the supply voltage constraint $V_{SupAvl}$.

The reference values locator 208 also includes a reference current adjuster 306 that is activated in response to the comparator 304 determining the optimized voltage command $V_{MTPA}$ is less-than or equal to the supply voltage constraint $V_{SupAvl}$. The reference current adjuster 306 is configured to set a reference d-axis current $I_{dref}$ (i.e. a d-axis component of the reference current vector $I_{dref}$, $I_{qref}$) equal to zero. In some embodiments, the reference current adjuster 306 may also set a reference q-axis current $I_{qref}$ (i.e. a q-axis component of the reference current vector $I_{dref}$, $I_{qref}$) equal to a q-axis component of the optimized current command $I_{dmin}$, $I_{qmin}$. The reference current adjuster 306 may have no effect on the reference current vector $I_{dref}$, $I_{qref}$ unless the optimized voltage command $V_{MTPA}$ is less-than or equal to the supply voltage constraint $V_{SupAvl}$.

The reference values locator 208 also includes a reference current calculator 308 that is activated in response to the comparator 304 determining the optimized voltage command $V_{MTPA}$ being not less-than or equal to the supply voltage constraint $V_{SupAvl}$. The reference current calculator 308 determines a required d-axis current $I_{dreq}$ based on the optimized voltage command $V_{MTPA}$ and based on the bridge voltage $V_{ECU}$ satisfying the supply voltage constraint $V_{SupAvl}$. The reference current calculator 308 also determines the reference current vector $I_{dref}$, $I_{qref}$ including a reference d-axis current $I_{dref}$ based on the required d-axis current $I_{dreq}$. The reference current calculator 308 may calculate the reference d-axis current $I_{dref}$ as set forth in equation (14) or as set forth in equation (15), as explained below.

The reference values locator 208 also includes a reference voltage calculator 310 that computes the reference voltage vector $V_{dref}$, $V_{qref}$ based on the reference current vector $I_{dref}$, $I_{qref}$. The reference voltage calculator 310 may calculate the reference voltage vector $V_{dref}$, $V_{qref}$ as set forth in equation (16), as described further below.

Figure 4:
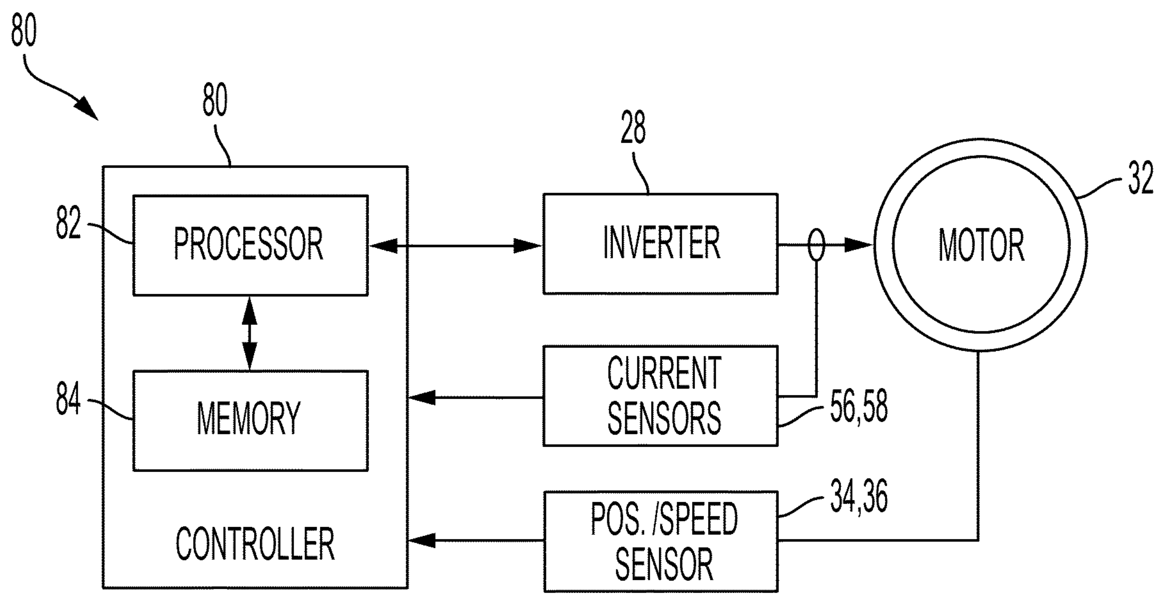
FIG. 4 shows a block diagram showing hardware components of a motor control system, according to aspects of the present disclosure.

FIG. 4 shows a block diagram showing hardware components of the motor control system 10. As shown, the motor control system 10 includes the SPM motor 32 connected to the inverter 28. The inverter 28 is configured to generate and supply AC power to the SPM motor 32. The motor control system 10 also includes current sensors 56, 58 that measure one or more phase currents in corresponding motor leads between the 28 and the SPM motor 32. The motor control system 10 also includes a speed sensor 36 and/or position sensor 34 that measures a rotational position of the SPM motor 32.

The motor control system 10 also includes a controller 80. The controller 80 may include any suitable controller, such as an electronic control unit or other suitable controller. The controller 80 may be configured to control, for example, the various functions of the steering system and/or various functions of a vehicle. The controller 80 may include a processor 82 and a memory 84. The processor 82 may include any suitable processor, such as those described herein. Additionally, or alternatively, the controller 80 may include any suitable number of processors, in addition to or other than the processor 82. The memory 84 may comprise a single disk or a plurality of disks (e.g., hard drives), and includes a storage management module that manages one or more partitions within the memory 84. In some embodiments, memory 84 may include flash memory, semiconductor (solid state) memory or the like. The memory 84 may include Random Access Memory (RAM), a Read-Only Memory (ROM), or a combination thereof. The memory 84 may include instructions that, when executed by the processor 82, cause the processor 82 to, at least, control various aspects of the vehicle. Additionally, or alternatively, the memory 84 may include instructions that, when executed by the processor 82, cause the processor 82 to perform functions associated with the systems and methods described herein.

As shown, the controller 80 is operably connected to the inverter 28 and configured to send one or more commands to cause the inverter 28 to supply the AC power to the SPM motor 32. The controller 80 may receive one or more signals from the current sensors 56, 58, the position sensor 34 and/or the speed sensor 36, the inverter 28 and/or one or more other sensors. The sensors may include any suitable sensors, measurement devices, and/or other suitable mechanisms. For example, the sensors may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 80 may perform the methods described herein. However, the methods described herein as performed by the controller 80 are not meant to be limiting, and any type of software executed on a controller or processor can perform the methods described herein without departing from the scope of this disclosure. For example, a controller, such as a processor executing software within a computing device, can perform the methods described herein.

Direct-axis and quadrature-axis voltage equations for PMSM are as follows equation set (1):

$$V_d = \frac{\sqrt{3}}{2}(RI_d + \omega_e L_q I_q) \quad (1)$$
$$V_q = \frac{\sqrt{3}}{2}(RI_q - \omega_e L_d I_d) + K_e\omega_m$$

where, R and $K_e$ are the resistance, and back EMF constant, $L_d$ and $L_q$ are the d- and q-axis inductances, respectively; $V_d$ and $V_q$ are the d- and q-axis voltages, respectively; $I_d$ and $I_q$ are the d- and q-axis currents, respectively; $\omega_m$ and $\omega_e$ are the mechanical speed and electrical speed, respectively.

Torque generated by a PMSM is described by equation (2):

$$T_e = \frac{\sqrt{3}}{2}K_e I_q + \frac{\sqrt{3}}{8}(L_q - L_d)I_d I_q \quad (2)$$

The relation between the mechanical speed $\omega_m$ and the electrical speed $\omega_e$ is set forth in equation (3):

$$\omega_e = \frac{n_p\omega_m}{2} \quad (3)$$

where $n_p$ is the number of poles of the motor.

For an SPM, $L_d$=$L_q$=L. Thus, Equations (1) and (2) can be written as equations (4) and (5):

$$\begin{bmatrix} V_d \\ V_q \end{bmatrix} = \frac{\sqrt{3}}{2}\begin{bmatrix} R & \omega_e L \\ -\omega_e L & R \end{bmatrix}\begin{bmatrix} I_d \\ I_q \end{bmatrix} + \begin{bmatrix} 0 \\ 1 \end{bmatrix}K_e\omega_m \quad (4)$$

$$T_e = \frac{\sqrt{3}}{2}K_e I_q \quad (5)$$

The peak torque value $T_{pk}$ is calculated by the peak torque calculator 202 based on the supply voltage constraint $V_{SupAvl}$ and the mechanical speed $\omega_m$ of the motor.

The minimum current locator 206 may calculate the optimized current command $I_{dmin}$, $I_{qmin}$ as set forth in equation (6):

$$\begin{bmatrix} I_{dmin} \\ I_{qmin} \end{bmatrix} = \begin{bmatrix} 0 \\ \dfrac{T_{CmdLim}}{\frac{\sqrt{3}}{2}K_e} \end{bmatrix} \quad (6)$$

Equation (4) can be used to calculate dq-voltages $V_{dmin}$, $V_{qmin}$ for the MTPA condition, as set forth in equation (7):

$$\begin{bmatrix} V_d \\ V_q \end{bmatrix} = \frac{\sqrt{3}}{2}\begin{bmatrix} R & \omega_e L \\ -\omega_e L & R \end{bmatrix}\begin{bmatrix} I_{dmin} \\ I_{qmin} \end{bmatrix} + \begin{bmatrix} 0 \\ 1 \end{bmatrix}K_e\omega_m \quad (7)$$

Equation set (8), below, shows the voltage magnitude equation for the MTPA condition.

$$V_{MTPA}^2 = [V_{dmin} \;\; V_{qmin}]\begin{bmatrix} V_{dmin} \\ V_{qmin} \end{bmatrix} = \quad (8)$$
$$\frac{3}{4}[I_{dmin} \;\; I_{qmin}]\begin{bmatrix} R & \omega_e L \\ -\omega_e L & R \end{bmatrix}\begin{bmatrix} R & \omega_e L \\ -\omega_e L & R \end{bmatrix}\begin{bmatrix} I_{dmin} \\ I_{qmin} \end{bmatrix} +$$
$$\frac{\sqrt{3}}{2}[I_{dmin} \;\; I_{qmin}]\begin{bmatrix} R & \omega_e L \\ -\omega_e L & R \end{bmatrix}\begin{bmatrix} 0 \\ 1 \end{bmatrix}K_e\omega_m +$$
$$\frac{\sqrt{3}}{2}[0 \;\; 1]\begin{bmatrix} R & \omega_e L \\ -\omega_e L & R \end{bmatrix}\begin{bmatrix} I_{dmin} \\ I_{qmin} \end{bmatrix}K_e\omega_m + [0 \;\; 1]\begin{bmatrix} 0 \\ 1 \end{bmatrix}K_e^2\omega_m^2 =$$
$$\frac{3}{4}I_{qmin}^2(R^2 + \omega_e^2 L^2) + \sqrt{3}\,I_{qmin}RK_e\omega_m + K_e^2\omega_m^2$$

If the optimized voltage command $V_{MTPA}$ is less than or equal to the supply voltage constraint $V_{SupAvl}$, then the reference current vector is determined as set forth in equation (9):

$$\text{if } V_{MTPA} \le V_{SupAvl}; \begin{bmatrix} I_{dref} \\ I_{qref} \end{bmatrix} = \begin{bmatrix} 0 \\ I_{qmin} \end{bmatrix} \quad (9)$$

However, when the optimized voltage command $V_{MTPA}$ is greater than the supply voltage constraint $V_{SupAvl}$, the d-axis current $I_d$ must have a non-zero value to generate the limited torque command $T_{CmdLim}$ at a given motor speed and to cause the motor control system 10 to satisfy the supply voltage constraint $V_{SupAvl}$.

Assume a required d-axis current $I_{dreq}$ is needed to maintain the supply voltage constraint $V_{SupAvl}$. The governing equation can be written as set forth in equation (10):

$$V_{SupAvl}^2 = [V_d \;\; V_q]\begin{bmatrix} V_d \\ V_q \end{bmatrix} = \quad (10)$$
$$\frac{3}{4}[I_{dreq} \;\; I_{qmin}]\begin{bmatrix} R & \omega_e L \\ -\omega_e L & R \end{bmatrix}\begin{bmatrix} R & \omega_e L \\ -\omega_e L & R \end{bmatrix}\begin{bmatrix} I_{dreq} \\ I_{qmin} \end{bmatrix} +$$
$$\frac{\sqrt{3}}{2}[I_{dreq} \;\; I_{qmin}]\begin{bmatrix} R & \omega_e L \\ -\omega_e L & R \end{bmatrix}\begin{bmatrix} 0 \\ 1 \end{bmatrix}K_e\omega_m +$$
$$\frac{\sqrt{3}}{2}[0 \;\; 1]\begin{bmatrix} R & \omega_e L \\ -\omega_e L & R \end{bmatrix}\begin{bmatrix} I_{dreq} \\ I_{qmin} \end{bmatrix}K_e\omega_m + [0 \;\; 1]\begin{bmatrix} 0 \\ 1 \end{bmatrix}K_e^2\omega_m^2 =$$
$$\frac{3}{4}I_{dreq}^2(R^2 + \omega_e^2 L^2) - \sqrt{3}\,I_{dreq}\omega_e LK_e\omega_m +$$
$$\frac{3}{4}I_{qmin}^2(R^2 + \omega_e^2 L^2) + \sqrt{3}\,I_{qmin}RK_e\omega_m + K_e^2\omega_m^2$$

Subtracting equation (8) from (10) results in equation (11):

$$\frac{3}{4}I_{dreq}^2(R^2 + \omega_e^2 L^2) - \sqrt{3}\,I_{d,req}\omega_e LK_e\omega_m = (V_{SupAvl}^2 - V_{MTPA}^2) \quad (11)$$

The required d-axis current $I_{dreq}$ can be calculated as set forth in equation (12):

$$I_{dreq} = \frac{\sqrt{3}\,\omega_e LK_e\omega_m - \sqrt{3(\omega_e LK_e\omega_m)^2 + 3(R^2 + \omega_e^2 L^2)(V_{MTPA}^2 - V_{SupAvl}^2)}}{\frac{3}{2}(R^2 + \omega_e^2 L^2)} \quad (12)$$

From equation (12), it is clear that for $$V_{MTPA}^2 \geq V_{SupAvl}^2,$$

$I_{dreq}$ will have a real solution. Thus, the reference current vector $I_{dref}$, $I_{qref}$ can be calculated as set forth in equation (13):

$$\begin{bmatrix} I_{dref} \\ I_{qref} \end{bmatrix} = \begin{bmatrix} \dfrac{\sqrt{3}\,\omega_e L K_e \omega_m - \sqrt{3(\omega_e L K_e \omega_m)^2 + 3(R^2 + \omega_e^2 L^2)(V_{MTPA}^2 - V_{SupAvl}^2)}}{\frac{3}{2}(R^2 + \omega_e^2 L^2)} \\ I_{qmin} \end{bmatrix} = \begin{bmatrix} I_{dreq} \\ I_{qmin} \end{bmatrix} \tag{13}$$

However, it may be necessary to constrain the reference d-axis current $I_{dref}$ to some value. The maximum d-axis current $I_{dmax}$, as determined by the peak torque calculator 202 202, may be used as a maximum value to constrain the reference d-axis current $I_{dref}$.

Thus, a final solution can be written as equation (14), below:

$$\text{if } V_{MTPA} \leq V_{SupAvl}; \begin{bmatrix} I_{dref} \\ I_{qref} \end{bmatrix} = \begin{bmatrix} 0 \\ \dfrac{T_{CmdLim}}{\frac{\sqrt{3}}{2} K_e} \end{bmatrix} \tag{14}$$

else $$\begin{bmatrix} I_{dref} \\ I_{qref} \end{bmatrix} = \begin{bmatrix} \min\left( I_{dmax}, \dfrac{\sqrt{3}\,\omega_e L K_e \omega_m - \sqrt{3(\omega_e L K_e \omega_m)^2 + 3(R^2 + \omega_e^2 L^2)(V_{MTPA}^2 - V_{SupAvl}^2)}}{\frac{3}{2}(R^2 + \omega_e^2 L^2)} \right) \\ \dfrac{T_{CmdLim}}{\frac{\sqrt{3}}{2} K_e} \end{bmatrix}$$

In some embodiments, an additional constraint may be used in determining the reference d-axis current $I_{dref}$ and to protect the SPM from demagnetization. We know that a d-axis current $I_d$ can cause demagnetization when $$I_d \geq \frac{K_e}{\left(\frac{n_p}{2}\right) L}$$

Thus, The final solution considering this additional constraint is given in (15).

$$\text{if } V_{MTPA} \leq V_{SupAvl}; \begin{bmatrix} I_{dref} \\ I_{qref} \end{bmatrix} = \begin{bmatrix} 0 \\ \dfrac{T_{CmdLim}}{\frac{\sqrt{3}}{2} K_e} \end{bmatrix} \tag{15}$$

else

-continued $$\begin{bmatrix} I_{dref} \\ I_{qref} \end{bmatrix} = \begin{bmatrix} \min\left( I_{dmax}, \dfrac{\sqrt{3}\,\omega_e L K_e \omega_m - \sqrt{3(\omega_e L K_e \omega_m)^2 + 3(R^2 + \omega_e^2 L^2)(V_{MTPA}^2 - V_{SupAvl}^2)}}{\frac{3}{2}(R^2 + \omega_e^2 L^2)}, \dfrac{K_e}{\left(\frac{n_p}{2}\right) L} \right) \\ \dfrac{T_{CmdLim}}{\frac{\sqrt{3}}{2} K_e} \end{bmatrix}$$

where γ is a scaling factor (between 0 to 1) that provides safety against demagnetization. After calculating the reference dq-currents, equation (16) can be used to locate the reference dq-voltages $V_{dref}$, $V_{qref}$.

$$\begin{bmatrix} V_{dref} \\ V_{qref} \end{bmatrix} = \frac{\sqrt{3}}{2} \begin{bmatrix} R & \omega_e L \\ -\omega_e L & R \end{bmatrix} \begin{bmatrix} I_{dref} \\ I_{qref} \end{bmatrix} + \begin{bmatrix} 0 \\ 1 \end{bmatrix} K_e \omega_m \tag{16}$$

Figure 5:
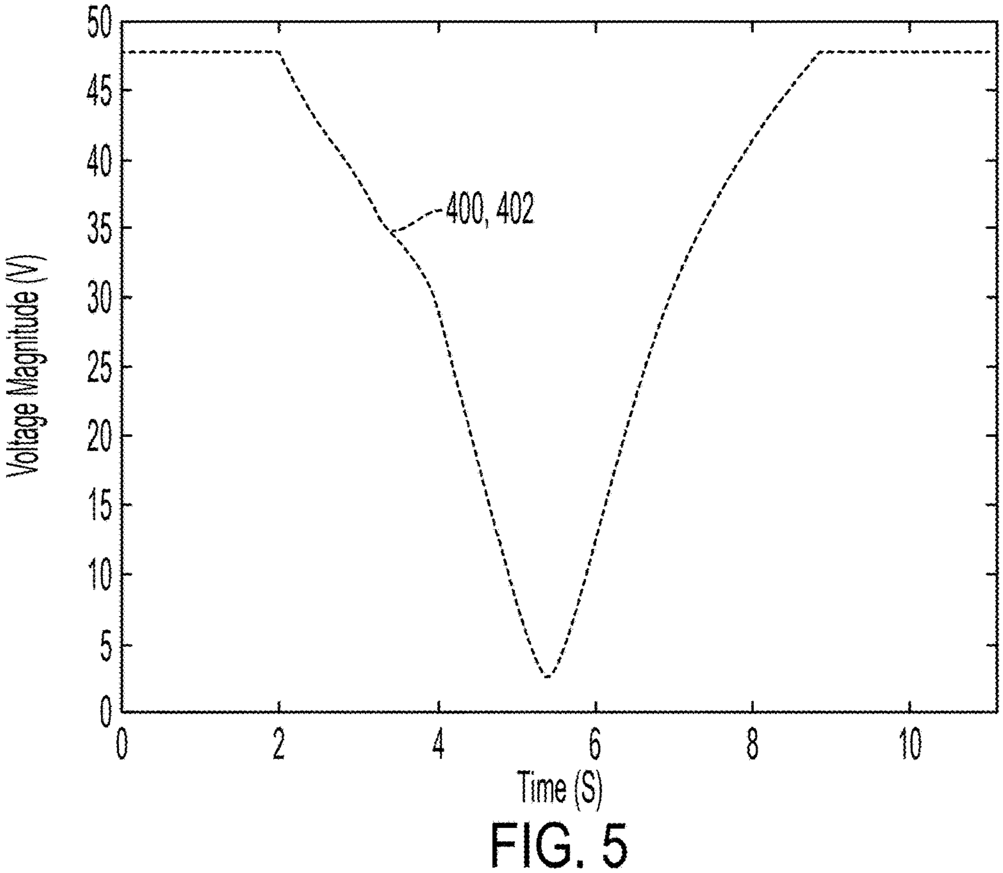
FIG. 5 shows a graph of motor voltage magnitude over time, and computed using an iterative technique and using a technique of the present disclosure.
Figure 6:
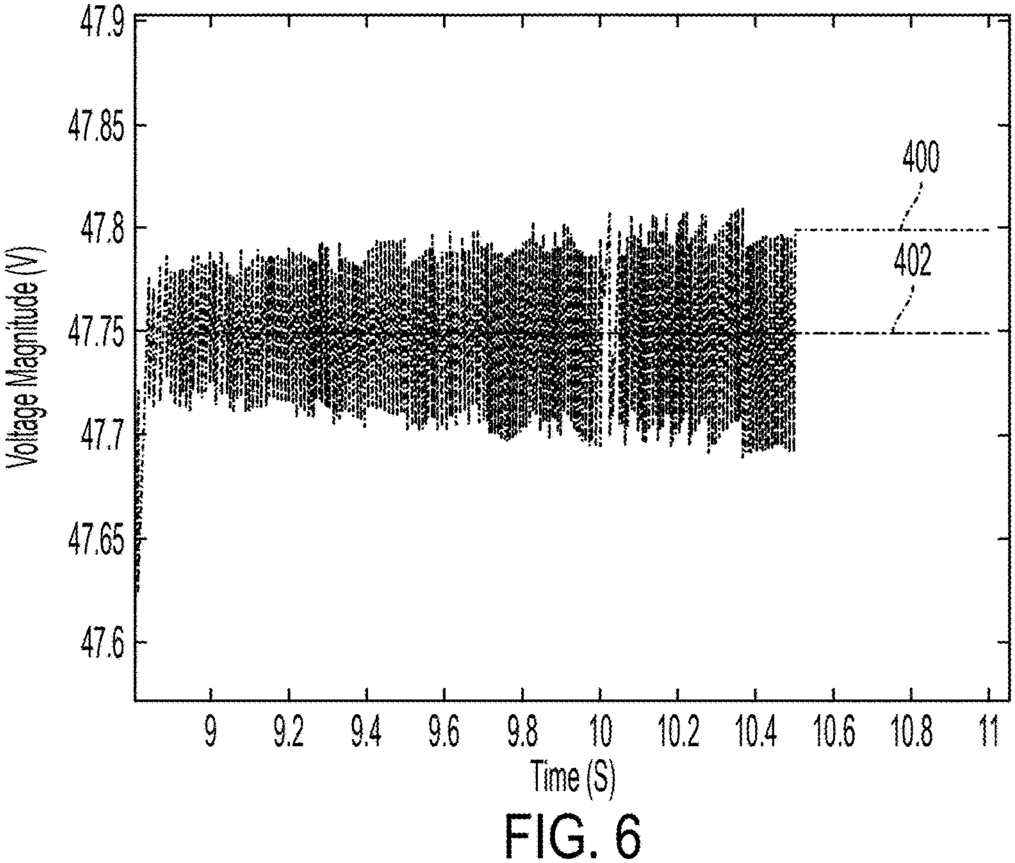
FIG. 6 shows a zoomed-in view of the graph of FIG. 5.

FIG. 5 shows a graph of motor voltage magnitude over time, and FIG. 6 shows a zoomed-in view of the graph of FIG. 5. Each of FIGS. 5-6 includes a first plot 400 showing the motor voltage magnitude and computed using an iterative technique, and a second plot 402 showing the motor voltage magnitude computed in accordance with the present disclosure. As shown, both techniques provide nearly identical results. However, and as shown on FIG. 6, the iterative technique oscillates between about 47.8V and 47.7V over short periods of time, whereas the technique of the present disclosure provides a more consistent motor voltage magnitude without the oscillation that results from the iterative technique.

Figure 7:
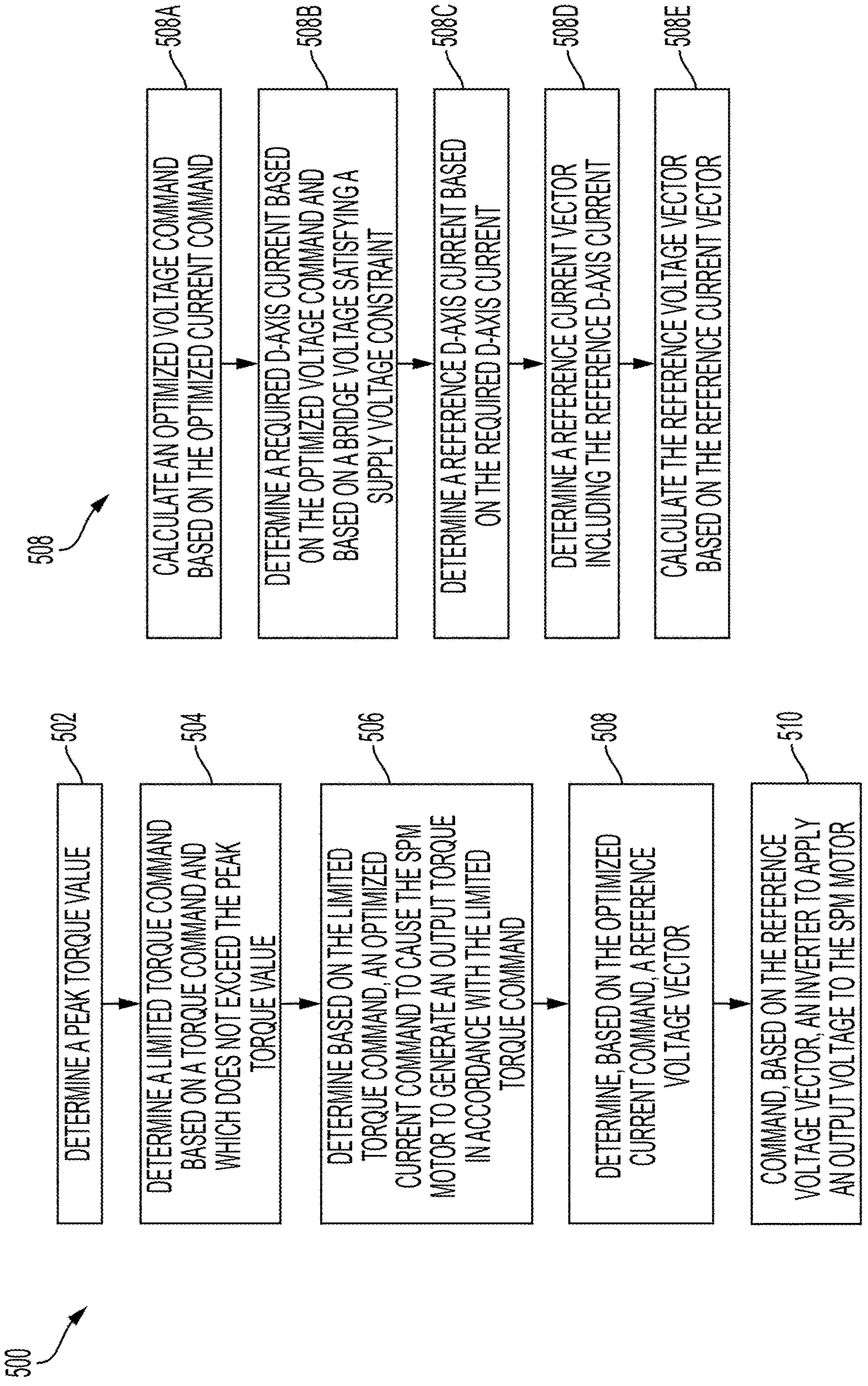
FIG. 7 is a flow diagram generally illustrating a method for controlling a surface-mounted permanent magnet (SPM) motor, according to the principles of the present disclosure

FIG. 7 is a flow diagram generally illustrating a method 500 method for controlling a surface-mounted permanent magnet (SPM) motor. The method 500 can be performed by the motor control system 10 of the present disclosure. As can be appreciated in light of the disclosure, the order of operation within the method is not limited to the sequential execution as illustrated in FIG. 7, but may be performed in one or more varying orders as applicable and in accordance with the present disclosure.

At 502, the method 500 determines a peak torque value. For example, the processor 82 may execute instructions to implement the peak torque calculator 202 to compute the peak torque value $T_{Pk}$.

At 504, the method 500 determines a limited torque command based on a torque command and which does not exceed the peak torque value. For example, the processor 82 may execute instructions to implement the torque command limiter 204 to determine the limited torque command $T_{CmdLim}$ based on the torque command $T_{Cmd}$ limited not to exceed the peak torque value $T_{pk}$.

At 506, the method 500 determines, based on the limited torque command, an optimized current command to cause the SPM motor to generate an output torque in accordance with the limited torque command. For example, the processor 82 may execute instructions to implement the minimum current locator 206 to determine the optimized current command $I_{dmin}$, $I_{qmin}$ based on the limited torque command $T_{CmdLim}$. Step 506 may include calculating the optimized current command $I_{dmin}$, $I_{qmin}$ as set forth in equation (6).

At 508, the method determines, based on the optimized current command, a reference voltage vector. For example, the processor 82 may execute instructions to implement the reference values locator 208 to determine the reference voltage vector $V_{dref}$, $V_{qref}$ based on the optimized current command $I_{dmin}$, $I_{qmin}$.

Step 508 includes calculating, at 508A, an optimized voltage command based on the optimized current command. For example, the processor 82 may execute instructions to implement the voltage calculator 302 to compute the optimized voltage command $V_{MTPA}$ based on the optimized current command $I_{dmin}$, $I_{qmin}$.

Step 508 also includes determining, at 508B, a required d-axis current based on the optimized voltage command and based on a bridge voltage satisfying a supply voltage constraint. For example, the processor 82 may execute instructions to implement the reference current calculator 308 to determine the required d-axis current $I_{dreq}$ based on the optimized voltage command $V_{MTPA}$ and based on the bridge voltage $V_{ECU}$ satisfying the supply voltage constraint $V_{SupAvl}$. The reference current calculator 308 may calculate the required d-axis current $I_{dreq}$ as set forth in equation (12).

Step 508 also includes determining, at 508C, a reference d-axis current based on the required d-axis current. For example, the processor 82 may execute instructions to implement the reference current calculator 308 to determine the reference d-axis current $I_{dref}$ based on the required d-axis current $I_{dreq}$. Step 508C may include calculating the reference d-axis current $I_{dref}$ as set forth in equation (14) or as set forth in equation (15).

Step 508 also includes determining, at 508D, a reference current vector including the reference d-axis current. For example, the processor 82 may execute instructions to implement the reference current calculator 308 to determine the reference current vector $I_{dref}$, $I_{qref}$ including the reference d-axis current $I_{dref}$.

Step 508 also includes calculating, at 508E, the reference voltage vector based on the reference current vector. For example, the processor 82 may execute instructions to implement the reference voltage calculator 310 to calculate the reference voltage vector $V_{dref}$, $V_{qref}$ based on the reference current vector $I_{dref}$, $I_{qref}$. Step 508E may include calculating the reference voltage vector $V_{dref}$, $V_{qref}$ as set forth in equation (16).

At 510, the method 500 commands, based on the reference voltage vector, an inverter to apply an output voltage to the SPM motor. For example, the processor 82 may execute instructions to command the inverter 28 to apply the output voltage to the windings of the SPM motor 32 and to supply the alternating current (AC) power to the SPM motor 32.

In some embodiments, the method 500 may further include: determining a maximum d-axis current based on the peak torque value and a plurality of motor parameters of the SPM motor; and determining a lesser one of the maximum d-axis current and the required d-axis current. Determining the reference d-axis current may include setting the reference d-axis current as the lesser one of the maximum d-axis current and the required d-axis current. For example, 508C may determine reference d-axis current as set forth in equation (14).

In some embodiments, the method 500 may further include: determining a maximum d-axis current based on the peak torque value and a plurality of motor parameters of the SPM motor; determining a demagnetization d-axis current representing a d-axis current associated with demagnetizing the SPM motor; and determining a lesser one of the maximum d-axis current, the required d-axis current, and the demagnetization d-axis current. Determining the reference d-axis current may include setting the reference d-axis current as the lesser one of the maximum d-axis current, the required d-axis current, and the demagnetization d-axis current. For example, 508C may determine reference d-axis current as set forth in equation (15).

In some embodiments, the method 500 may further include: comparing the optimized voltage command to the supply voltage constraint to determine if the optimized voltage command is less-than or equal to the supply voltage constraint; and setting the reference d-axis current equal to zero in response to determining the optimized voltage command being less-than or equal to the supply voltage constraint. For example, the processor 82 may execute instructions to implement the comparator 304 to compare the optimized voltage command $V_{MTPA}$ to the supply voltage constraint $V_{SupAvl}$ and to determine if the optimized voltage command $V_{MTPA}$ is less-than or equal to the supply voltage constraint $V_{SupAvl}$. The processor 82 may also execute instructions to implement the reference current adjuster 306 to set a reference d-axis current $I_{dref}$ equal to zero in response to the comparator 304 determining the optimized voltage command $V_{MTPA}$ being less-than or equal to the supply voltage constraint $V_{SupAvl}$.

The method 500 may proceed with 508B-508D only in response to the comparator 304 determining the optimized voltage command $V_{MTPA}$ being not less-than or equal to the supply voltage constraint $V_{SupAvl}$. In other words, the method 500 may determine the reference d-axis current $I_{dref}$ based on the required d-axis current $I_{dreq}$ only if the optimized voltage command $V_{MTPA}$ is greater than the supply voltage constraint $V_{SupAvl}$.

In some embodiments, the method 500 may further include: determining a reference q-axis current based on the based on the limited torque command. The reference current vector may further include the reference q-axis current. For example, the processor 82 may also execute instructions to calculate the reference q-axis current $$I_{dref} = \frac{T_{CmdLim}}{\frac{\sqrt{3}}{2} K_e},$$

and in accordance with each of equations (14) and (15).

In some embodiments, the method 500 may further include: determining a value of the optimized voltage command squared; determining a value of the supply voltage constraint squared; and determining a difference between the value of the optimized voltage command squared and the value of the supply voltage constraint squared. Determining the required d-axis current includes calculating the required d-axis current based on the difference between the value of the optimized voltage command squared and the value of the supply voltage constraint squared. For example, the processor 82 may execute instructions to implement the reference current calculator 308 to calculate the required d-axis current $I_{dreq}$ as set forth in equation (12), and where equation (12) includes a term $$\left(V_{MTPA}^2 - V_{SupAvl}^2\right)$$

representing the difference between the value of the optimized voltage command squared and the value of the supply voltage constraint squared.

The present disclosure provides a method for controlling a surface-mounted permanent magnet (SPM) motor. The method includes: determining a peak torque value; determining a limited torque command based on a torque command and which does not exceed the peak torque value; determining, based on the limited torque command, an optimized current command to cause the SPM motor to generate an output torque in accordance with the limited torque command; determining, based on the optimized current command, a reference voltage vector; and commanding, based on the reference voltage vector, an inverter to apply an output voltage to the SPM motor. Determining the reference voltage vector may include: calculating an optimized voltage command based on the optimized current command; determining a required d-axis current based on the optimized voltage command and based on a bridge voltage satisfying a supply voltage constraint; determining a reference d-axis current based on the required d-axis current; determining a reference current vector including the reference d-axis current; and calculating the reference voltage vector based on the reference current vector.

In some embodiments, the method further includes: determining a maximum d-axis current based on the peak torque value and a plurality of motor parameters of the SPM motor; and determining a lesser one of the maximum d-axis current and the required d-axis current. Determining the reference d-axis current may include setting the reference d-axis current as the lesser one of the maximum d-axis current and the required d-axis current.

In some embodiments, the method further includes: determining a maximum d-axis current based on the peak torque value and a plurality of motor parameters of the SPM motor; determining a demagnetization d-axis current representing a d-axis current associated with demagnetizing the SPM motor; and determining a lesser one of the maximum d-axis current, the required d-axis current, and the demagnetization d-axis current. Determining the reference d-axis current may include setting the reference d-axis current as the lesser one of the maximum d-axis current, the required d-axis current, and the demagnetization d-axis current.

In some embodiments, the method further includes: comparing the optimized voltage command to the supply voltage constraint to determine if the optimized voltage command is less-than or equal to the supply voltage constraint; and setting the reference d-axis current equal to zero in response to determining the optimized voltage command being less-than or equal to the supply voltage constraint. The reference d-axis current may be based on the required d-axis current only in response to determining the optimized voltage command being greater than the supply voltage constraint.

In some embodiments, the method further includes: determining a reference q-axis current based on the based on the limited torque command. The reference current vector may further includes the reference q-axis current.

In some embodiments, the method further includes: determining a value of the optimized voltage command squared; determining a value of the supply voltage constraint squared; and determining a difference between the value of the optimized voltage command squared and the value of the supply voltage constraint squared. Determining the required d-axis current may include calculating the required d-axis current based on the difference between the value of the optimized voltage command squared and the value of the supply voltage constraint squared.

In some embodiments, determining the required d-axis current includes calculating the required d-axis current ($I_{dreq}$) in accordance with:

$$I_{dreq} = \frac{\sqrt{3}\,\omega_e L K_e \omega_m - \sqrt{3(\omega_e L K_e \omega_m)^2 + 3\left(R^2 + \omega_e^2 L^2\right)\left(V_{MTPA}^2 - V_{SupAvl}^2\right)}}{\frac{3}{2}\left(R^2 + \omega_e^2 L^2\right)},$$

where $V_{MTPA}$ is the optimized voltage command, $V_{SupAvl}$ is the supply voltage constraint, and R, L, $K_e$, $\omega_m$, and $\omega_e$ are resistance, inductance, back EMF constant, mechanical speed, and electrical speed of the SPM motor, respectively.

In some embodiments, calculating the reference voltage vector based on the reference current vector includes calculating the reference voltage vector in accordance with:

$$\begin{bmatrix} V_{dref} \\ V_{qref} \end{bmatrix} = \frac{\sqrt{3}}{2}\begin{bmatrix} R & \omega_e L \\ -\omega_e L & R \end{bmatrix}\begin{bmatrix} I_{dref} \\ I_{qref} \end{bmatrix} + \begin{bmatrix} 0 \\ 1 \end{bmatrix} K_e \omega_m,$$

where $V_{dref}$ and $V_{qref}$ are d-axis and q-axis components of the reference voltage vector, respectively, $I_{dref}$ and $I_{qref}$ are d-axis and q-axis components of the reference current vector, respectively, and R, L, $K_e$, $\omega_m$, and $\omega_e$ are resistance, inductance, back EMF constant, mechanical speed, and electrical speed of the SPM motor, respectively.

In some embodiments, determining the optimized current command includes calculating the optimized current command in accordance with:

$$\begin{bmatrix} I_{dmin} \\ I_{qmin} \end{bmatrix} = \begin{bmatrix} 0 \\ \dfrac{T_{CmdLim}}{\frac{\sqrt{3}}{2} K_e} \end{bmatrix},$$

where $I_{dmin}$ and $I_{qmin}$ are d-axis and q-axis components of the optimized current command, respectively, $T_{CmdLim}$ is the limited torque command, and $K_e$ is a back EMF constant of the SPM motor.

The present disclosure provides an electronic controller including: a processor; and a memory that includes instructions. The instructions, when executed by the processor, cause the processor to: determine a peak torque value; determine a limited torque command based on a torque command and which does not exceed the peak torque value; determine, based on the limited torque command, an optimized current command to cause a surface-mounted permanent magnet (SPM) motor to generate an output torque in accordance with the limited torque command; determine, based on the optimized current command, a reference voltage vector; and command, based on the reference voltage vector, an inverter to apply an output voltage to the SPM motor. The instructions may further cause the processor to: calculate an optimized voltage command based on the optimized current command; determine a required d-axis current based on the optimized voltage command and based on a bridge voltage satisfying a supply voltage constraint; determine a reference d-axis current based on the required d-axis current; determine a reference current vector including the reference d-axis current; and calculate the reference voltage vector based on the reference current vector.

In some embodiments, the instructions further cause the processor to: determine a maximum d-axis current based on the peak torque value and a plurality of motor parameters of the SPM motor; and determine a lesser one of the maximum d-axis current and the required d-axis current. The instructions may further cause the processor to set the reference d-axis current as the lesser one of the maximum d-axis current and the required d-axis current.

In some embodiments, the instructions further cause the processor to: determine a maximum d-axis current based on the peak torque value and a plurality of motor parameters of the SPM motor; determine a demagnetization d-axis current representing a d-axis current associated with demagnetizing the SPM motor; and determine a lesser one of the maximum d-axis current, the required d-axis current, and the demagnetization d-axis current. The instructions may further cause the processor to set the reference d-axis current as the lesser one of the maximum d-axis current, the required d-axis current, and the demagnetization d-axis current.

In some embodiments, the instructions further cause the processor to: compare the optimized voltage command to the supply voltage constraint to determine if the optimized voltage command is less-than or equal to the supply voltage constraint; and set the reference d-axis current equal to zero in response to determining the optimized voltage command being less-than or equal to the supply voltage constraint. The reference d-axis current may be based on the required d-axis current only in response to determining the optimized voltage command being greater than the supply voltage constraint.

In some embodiments, the instructions further cause the processor to determine a reference q-axis current based on the based on the limited torque command. The reference current vector may further include the reference q-axis current.

In some embodiments, the instructions further cause the processor to: determine a value of the optimized voltage command squared; determine a value of the supply voltage constraint squared; and determine a difference between the value of the optimized voltage command squared and the value of the supply voltage constraint squared. The instructions may further cause the processor to calculate the required d-axis current based on the difference between the value of the optimized voltage command squared and the value of the supply voltage constraint squared.

In some embodiments, the instructions further cause the processor to calculate the required d-axis current ($I_{dreq}$) in accordance with:

$$I_{dreq} = \frac{\sqrt{3}\,\omega_e L K_e \omega_m - \sqrt{3(\omega_e L K_e \omega_m)^2 + 3\left(R^2 + \omega_e^2 L^2\right)\left(V_{MTPA}^2 - V_{supAvl}^2\right)}}{\frac{3}{2}\left(R^2 + \omega_e^2 L^2\right)},$$

where $V_{MTPA}$ is the optimized voltage command, $V_{SupAvl}$ is the supply voltage constraint, and R, L, $K_e$, $\omega_m$, and We are resistance, inductance, back EMF constant, mechanical speed, and electrical speed of the SPM motor, respectively.

In some embodiments, the instructions further cause the processor to calculate the reference voltage vector in accordance with:

$$\begin{bmatrix} V_{dref} \\ V_{qref} \end{bmatrix} = \frac{\sqrt{3}}{2}\begin{bmatrix} R & \omega_e L \\ -\omega_e L & R \end{bmatrix}\begin{bmatrix} I_{dref} \\ I_{qref} \end{bmatrix} + \begin{bmatrix} 0 \\ 1 \end{bmatrix} K_e \omega_m,$$

where $V_{dref}$ and $V_{qref}$ are d-axis and q-axis components of the reference voltage vector, respectively, $I_{dref}$ and $I_{qref}$ are d-axis and q-axis components of the reference current vector, respectively, and R, L, $K_e$, $\omega_m$, and $\omega_e$ are resistance, inductance, back EMF constant, mechanical speed, and electrical speed of the SPM motor, respectively.

In some embodiments, the instructions further cause the processor to calculate the optimized current command in accordance with:

$$\begin{bmatrix} I_{dmin} \\ I_{qmin} \end{bmatrix} = \begin{bmatrix} 0 \\ \dfrac{T_{CmdLim}}{\frac{\sqrt{3}}{2} K_e} \end{bmatrix},$$

where $I_{dmin}$ and $I_{qmin}$ are d-axis and q-axis components of the optimized current command, respectively, $T_{CmdLim}$ is the limited torque command, and $K_e$ is a back EMF constant of the SPM motor.

The present disclosure also provides a motor control system. The motor control system includes: a surface-mounted permanent magnet (SPM) motor; an inverter configured to supply an alternating current (AC) power to the SPM motor; and a controller. The controller is configured to: determine a peak torque value; determine a limited torque command based on a torque command and which does not exceed the peak torque value; determine, based on the limited torque command, an optimized current command to cause the SPM motor to generate an output torque in accordance with the limited torque command; determine, based on the optimized current command, a reference voltage vector; and command, based on the reference voltage vector, the inverter to apply an output voltage to the SPM motor. The controller may be further configured to: calculate an optimized voltage command based on the optimized current command; determine a required d-axis current based on the optimized voltage command and based on a bridge voltage satisfying a supply voltage constraint; determine a reference d-axis current based on the required d-axis current; determine a reference current vector including the reference d-axis current; and calculate the reference voltage vector based on the reference current vector.

In some embodiments, the SPM motor is an actuator motor configured to provide a steering assist toque for a steering system in a vehicle.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A method for controlling a surface-mounted permanent magnet (SPM) motor, the method comprising:

determining a peak torque value;

determining a limited torque command based on a torque command and which does not exceed the peak torque value;

determining, based on the limited torque command, an optimized current command to cause the SPM motor to generate an output torque in accordance with the limited torque command;

determining, based on the optimized current command, a reference voltage vector; and commanding, based on the reference voltage vector, an inverter to apply an output voltage to the SPM motor, wherein determining the reference voltage vector includes:

calculating an optimized voltage command based on the optimized current command;

determining a required d-axis current based on the optimized voltage command and based on a bridge voltage satisfying a supply voltage constraint;

determining a reference d-axis current based on the required d-axis current;

determining a reference current vector including the reference d-axis current; and calculating the reference voltage vector based on the reference current vector.

2. The method of claim 1, further comprising:

determining a maximum d-axis current based on the peak torque value and a plurality of motor parameters of the SPM motor; and determining a lesser one of the maximum d-axis current and the required d-axis current, wherein determining the reference d-axis current includes setting the reference d-axis current as the lesser one of the maximum d-axis current and the required d-axis current.

3. The method of claim 1, further comprising:

determining a maximum d-axis current based on the peak torque value and a plurality of motor parameters of the SPM motor;

determining a demagnetization d-axis current representing a d-axis current associated with demagnetizing the SPM motor; and determining a lesser one of the maximum d-axis current, the required d-axis current, and the demagnetization d-axis current, wherein determining the reference d-axis current includes setting the reference d-axis current as the lesser one of the maximum d-axis current, the required d-axis current, and the demagnetization d-axis current.

4. The method of claim 1, further comprising:

comparing the optimized voltage command to the supply voltage constraint to determine if the optimized voltage command is less-than or equal to the supply voltage constraint; and setting the reference d-axis current equal to zero in response to determining the optimized voltage command being less-than or equal to the supply voltage constraint, and wherein the reference d-axis current is based on the required d-axis current only in response to determining the optimized voltage command being greater than the supply voltage constraint.

5. The method of claim 1, further comprising: determining a reference q-axis current based on the based on the limited torque command, and wherein the reference current vector further includes the reference q-axis current.

6. The method of claim 1, further comprising:

determining a value of the optimized voltage command squared;

determining a value of the supply voltage constraint squared; and determining a difference between the value of the optimized voltage command squared and the value of the supply voltage constraint squared, wherein determining the required d-axis current includes calculating the required d-axis current based on the difference between the value of the optimized voltage command squared and the value of the supply voltage constraint squared.

7. The method of claim 1, wherein determining the required d-axis current includes calculating the required d-axis current ($I_{dreq}$) in accordance with:

$$I_{dreq} = \frac{\sqrt{3}\,\omega_e L K_e \omega_m - \sqrt{3(\omega_e L K_e \omega_m)^2 + 3(R^2 + \omega_e^2 L^2)(V_{MTPA}^2 - V_{supAvl}^2)}}{\frac{3}{2}(R^2 + \omega_e^2 L^2)},$$

where $V_{MTPA}$ is the optimized voltage command, $V_{SupAvl}$ is the supply voltage constraint, and R, L, $K_e$, $\omega_m$, and $\omega_e$ are resistance, inductance, back EMF constant, mechanical speed, and electrical speed of the SPM motor, respectively.

8. The method of claim 1, wherein calculating the reference voltage vector based on the reference current vector includes calculating the reference voltage vector in accordance with:

$$\begin{bmatrix} V_{dref} \\ V_{qref} \end{bmatrix} = \frac{\sqrt{3}}{2}\begin{bmatrix} R & \omega_e L \\ -\omega_e L & R \end{bmatrix}\begin{bmatrix} I_{dref} \\ I_{qref} \end{bmatrix} + \begin{bmatrix} 0 \\ 1 \end{bmatrix} K_e \omega_m,$$

where $V_{dref}$ and $V_{qref}$ are d-axis and q-axis components of the reference voltage vector, respectively, $I_{dref}$ and $I_{qref}$ are d-axis and q-axis components of the reference current vector, respectively, and R, L, $K_e$, $\omega_m$, and $\omega_e$ are resistance, inductance, back EMF constant, mechanical speed, and electrical speed of the SPM motor, respectively.

9. The method of claim 1, wherein determining the optimized current command includes calculating the optimized current command in accordance with:

$$\begin{bmatrix} I_{dmin} \\ I_{qmin} \end{bmatrix} = \begin{bmatrix} 0 \\ \dfrac{T_{CmdLin}}{\frac{\sqrt{2}}{2} K_e} \end{bmatrix},$$

where $I_{dmin}$ and $I_{qmin}$ are d-axis and q-axis components of the optimized current command, respectively, $T_{CmdLim}$ is the limited torque command, and $K_e$ is a back EMF constant of the SPM motor.

10. An electronic controller comprising:

a processor; and a memory that includes instructions that, when executed by the processor, cause the processor to:

determine a peak torque value;

determine a limited torque command based on a torque command and which does not exceed the peak torque value;

determine, based on the limited torque command, an optimized current command to cause a surface-mounted permanent magnet (SPM) motor to generate an output torque in accordance with the limited torque command;

determine, based on the optimized current command, a reference voltage vector; and command, based on the reference voltage vector, an inverter to apply an output voltage to the SPM motor, wherein the instructions further cause the processor to:

calculate an optimized voltage command based on the optimized current command;

determine a required d-axis current based on the optimized voltage command and based on a bridge voltage satisfying a supply voltage constraint;

determine a reference d-axis current based on the required d-axis current;

determine a reference current vector including the reference d-axis current; and calculate the reference voltage vector based on the reference current vector.

11. The electronic controller of claim 10, wherein the instructions further cause the processor to:

determine a maximum d-axis current based on the peak torque value and a plurality of motor parameters of the SPM motor; and determine a lesser one of the maximum d-axis current and the required d-axis current, wherein the instructions further cause the processor to set the reference d-axis current as the lesser one of the maximum d-axis current and the required d-axis current.

12. The electronic controller of claim 10, wherein the instructions further cause the processor to:

determine a maximum d-axis current based on the peak torque value and a plurality of motor parameters of the SPM motor;

determine a demagnetization d-axis current representing a d-axis current associated with demagnetizing the SPM motor; and determine a lesser one of the maximum d-axis current, the required d-axis current, and the demagnetization d-axis current, wherein the instructions further cause the processor to set the reference d-axis current as the lesser one of the maximum d-axis current, the required d-axis current, and the demagnetization d-axis current.

13. The electronic controller of claim 10, wherein the instructions further cause the processor to:

compare the optimized voltage command to the supply voltage constraint to determine if the optimized voltage command is less-than or equal to the supply voltage constraint; and set the reference d-axis current equal to zero in response to determining the optimized voltage command being less-than or equal to the supply voltage constraint, and wherein the reference d-axis current is based on the required d-axis current only in response to determining the optimized voltage command being greater than the supply voltage constraint.

14. The electronic controller of claim 10, wherein the instructions further cause the processor to determine a reference q-axis current based on the based on the limited torque command, and wherein the reference current vector further includes the reference q-axis current.

15. The electronic controller of claim 10, wherein the instructions further cause the processor to:

determine a value of the optimized voltage command squared;

determine a value of the supply voltage constraint squared; and determine a difference between the value of the optimized voltage command squared and the value of the supply voltage constraint squared, wherein the instructions further cause the processor to calculate the required d-axis current based on the difference between the value of the optimized voltage command squared and the value of the supply voltage constraint squared.

16. The electronic controller of claim 10, wherein the instructions further cause the processor to calculate the required d-axis current ($I_{dreq}$) in accordance with:

$$I_{dreq} = \frac{\sqrt{3}\,\omega_e L K_e \omega_m - \sqrt{3(\omega_e L K_e \omega_m)^2 + 3(R^2 + \omega_e^2 L^2)(V_{MTPA}^2 - V_{SupAvl}^2)}}{\frac{3}{2}(R^2 + \omega_e^2 L^2)},$$

where $V_{MTPA}$ is the optimized voltage command, $V_{SupAvl}$ is the supply voltage constraint, and R, L, $K_e$, $\omega_m$, and $\omega_e$ are resistance, inductance, back EMF constant, mechanical speed, and electrical speed of the SPM motor, respectively.

17. The electronic controller of claim 10, wherein the instructions further cause the processor to calculate the reference voltage vector in accordance with:

$$\begin{bmatrix} V_{dref} \\ V_{qref} \end{bmatrix} = \frac{\sqrt{3}}{2} \begin{bmatrix} R & \omega_e L \\ -\omega_e L & R \end{bmatrix} \begin{bmatrix} I_{dref} \\ I_{qref} \end{bmatrix} + \begin{bmatrix} 0 \\ 1 \end{bmatrix} K_e \omega_m,$$

where $V_{dref}$ and $V_{qref}$ are d-axis and q-axis components of the reference voltage vector, respectively, $I_{dref}$ and $I_{qref}$ are d-axis and q-axis components of the reference current vector, respectively, and R, L, $K_e$, $\omega_m$, and $\omega_e$ are resistance, inductance, back EMF constant, mechanical speed, and electrical speed of the SPM motor, respectively.

18. The electronic controller of claim 10, wherein the instructions further cause the processor to calculate the optimized current command in accordance with:

$$\begin{bmatrix} I_{dmin} \\ I_{qmin} \end{bmatrix} = \begin{bmatrix} 0 \\ \dfrac{T_{CmdLim}}{\frac{\sqrt{3}}{2} K_e} \end{bmatrix},$$

where $I_{dmin}$ and $I_{qmin}$ are d-axis and q-axis components of the optimized current command, respectively, $T_{CmdLim}$ is the limited torque command, and $K_e$ is a back EMF constant of the SPM motor.

19. A motor control system, comprising:

a surface-mounted permanent magnet (SPM) motor;

an inverter configured to supply an alternating current (AC) power to the SPM motor; and a controller configured to:

determine a peak torque value;

determine a limited torque command based on a torque command and which does not exceed the peak torque value;

determine, based on the limited torque command, an optimized current command to cause the SPM motor to generate an output torque in accordance with the limited torque command;

determine, based on the optimized current command, a reference voltage vector; and command, based on the reference voltage vector, the inverter to apply an output voltage to the SPM motor, wherein the controller is further configured to:

calculate an optimized voltage command based on the optimized current command;

determine a required d-axis current based on the optimized voltage command and based on a bridge voltage satisfying a supply voltage constraint;

determine a reference d-axis current based on the required d-axis current;

determine a reference current vector including the reference d-axis current; and calculate the reference voltage vector based on the reference current vector.

20. The motor control system of claim 19, wherein the SPM motor is an actuator motor configured to provide a steering assist toque for a steering system in a vehicle.

* * * * *